May 10, 1938.    P. CARLSON    2,116,666
TRUCK CONVERSION
Filed June 11, 1936    2 Sheets-Sheet 1
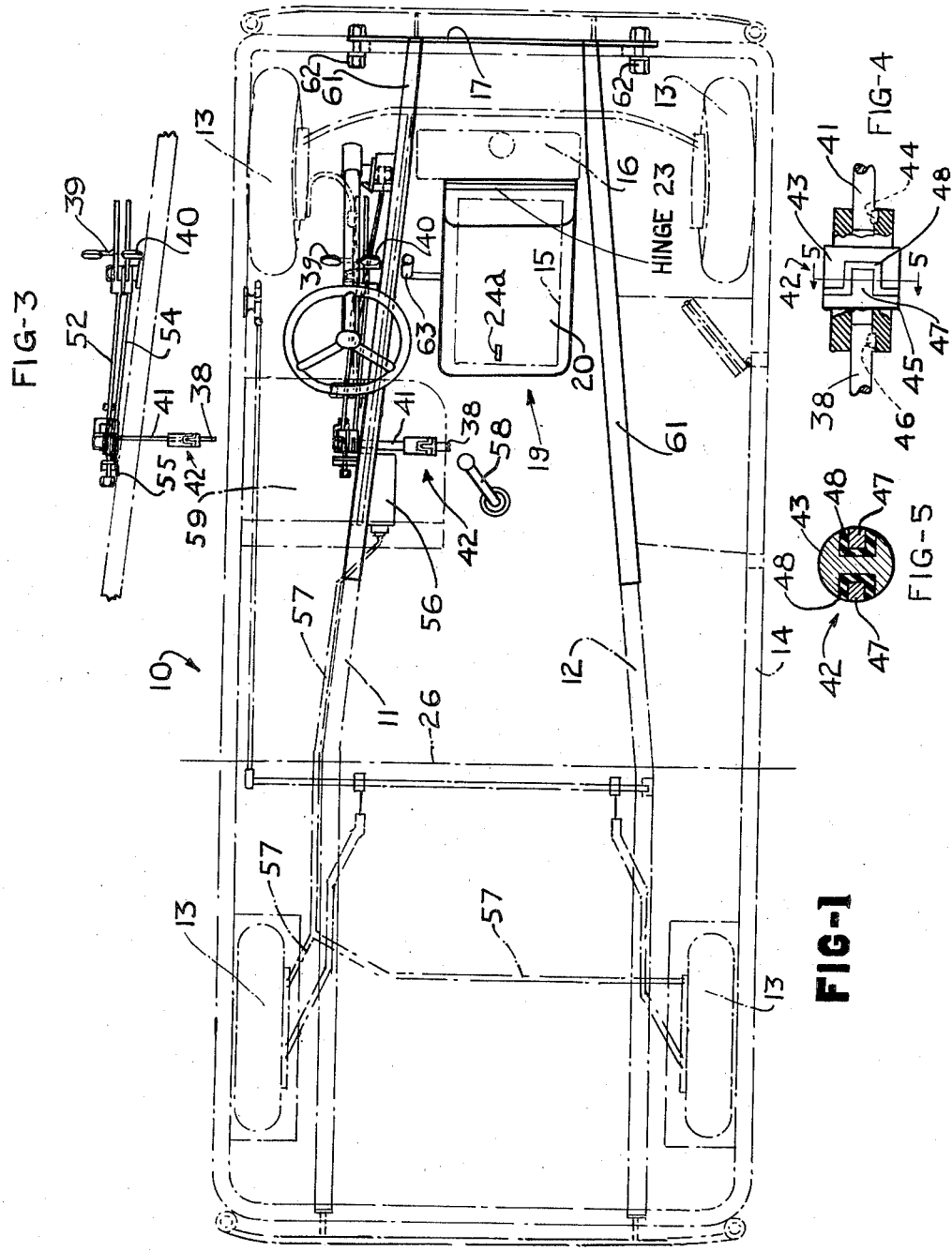
PHILIP CARLSON
INVENTOR
BY *John J. Hanrahan*
ATTORNEY May 10, 1938.　　　P. CARLSON　　　2,116,666
TRUCK CONVERSION
Filed June 11, 1936　　　2 Sheets-Sheet 2
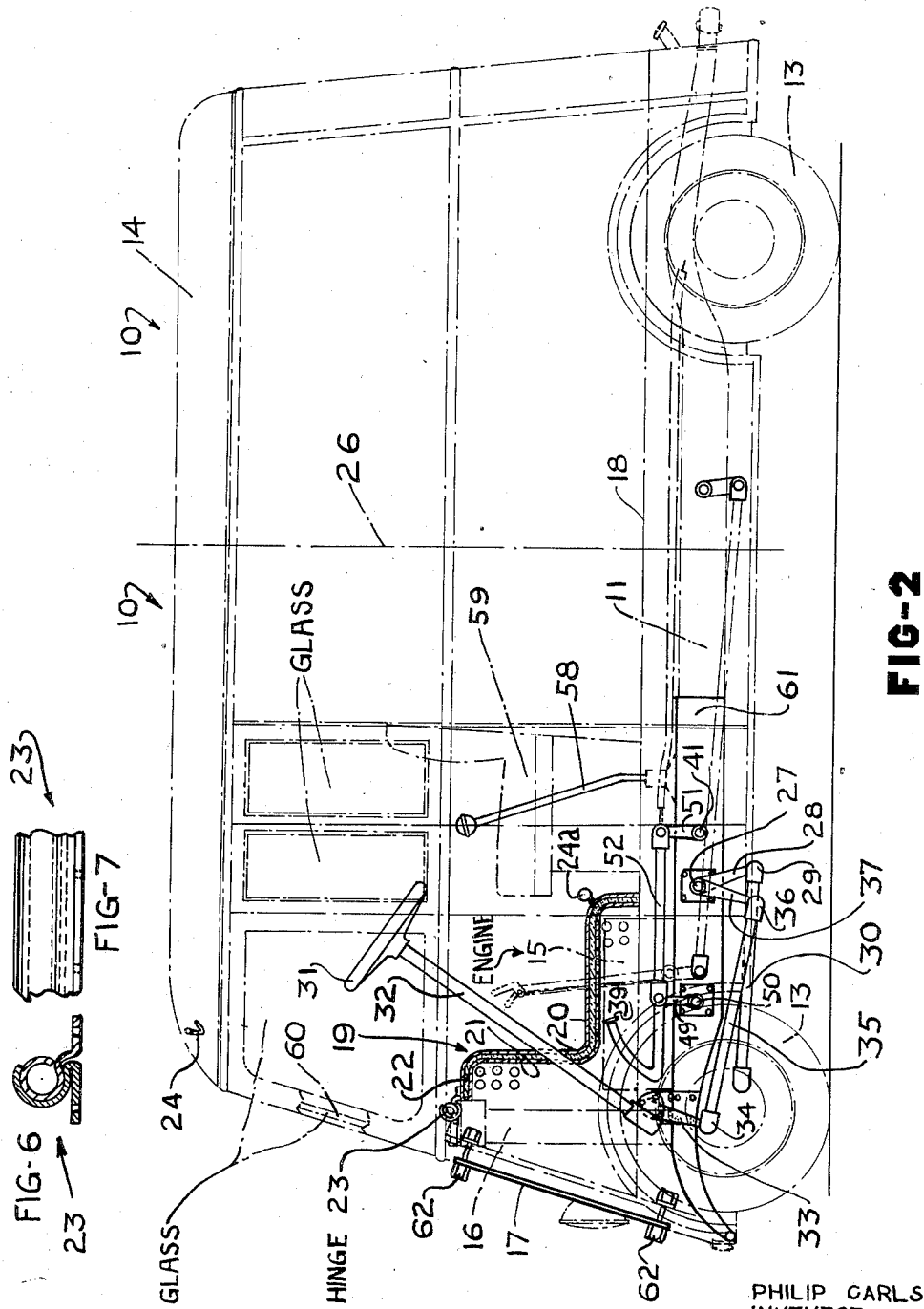

Patented May 10, 1938

2,116,666

UNITED STATES PATENT OFFICE 2,116,666

TRUCK CONVERSION

Philip Carlson, Long Hill, Conn., assignor, by direct and mesne assignments, to The Metropolitan Body Company, Bridgeport, Conn., a corporation of Connecticut Application June 11, 1936, Serial No. 84,765

2 Claims. (Cl. 180—54)

This invention relates to new and useful improvements in motor vehicles and has particular relation to automobile trucks.

An object of the invention is to provide a truck, rebuilt from the usual construction of truck, but which, without any increase in height or over-all length, is of greatly increased cubic capacity, has increased floor space available for loads and gives greater visibility to a driver.

The converted truck of the invention is particularly adapted for carrying bulky loads such as boxes, bread etc. and since the over-all length of the truck is not increased it obviously may be parked or stored in the usual limited space.

Other objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:—

Fig. 1 is a top plan view of the truck the body being shown in outline;

Fig. 2 is a side view of the truck;

Fig. 3 is a plan view of the brake and clutch operating pedals and the means connecting them to the usual brake and clutch pedal operated parts;

Fig. 4 is an enlarged view of a flexible coupling employed;

Fig. 5 is a sectional view taken substantially along the line 5—5 of Fig. 4; and Figs. 6 and 7 are sectional and plan views respectively of portions of a hinge employed.

According to the invention a truck of the usual construction is converted to increase its floor space and its cubic capacity without increasing its over-all length. Thus the volumetric capacity of the truck is greatly increased without increasing its length so that the converted truck is particularly useful for the carrying of bulky light weight loads such as bread, pies etc., and may be parked in a relatively small space.

Referring in detail to the drawings a truck is outlined at 10 as comprising a chassis including side frame members 11 and 12 mounted on wheels 13 and supporting a body 14. Between the forward portions of the members 11 and 12 there is mounted the engine 15 for propelling the truck through any or the usual driving means (not shown). Forwardly of the engine is any or the usual radiator 16 shown as disposed within the body 14 inwardly of a front removable panel 17 later to be more fully referred to.

Engine 15 projects above the floor line 18 of the truck body and within such body 14 is enclosed by a housing 19 comprising a heat and sound insulator serving to keep the engine fumes, noise and heat from the interior of the truck. Such housing is of laminated construction comprising an outer covering layer 20 which may be of metal, leather or imitation leather, an inner perforated metal layer 21 and an intermediate layer 22. Such intermediate layer is of heat insulating material and also serves with the perforated inner layer 21 as a sound deadener.

Housing 19 is hinged at its forward end as at 23 whereby it may be swung from a position enclosing the engine as in Figs. 1 and 2 to a substantially vertical position in which the engine is exposed to the interior of the truck body so that access may be had to the engine for adjustments or repairs. Any suitable means such as a hook 24 may be provided for securing the housing 19 in the raised or open position, such hook for that purpose cooperating with a ring or eye 24a on the housing. The hinge 23 is constructed to permit of detaching the housing 19 whereby it may be removed from the truck to give more complete access to the engine. This hinge 23 is more particularly disclosed in my Patent 1,858,880 of May 17, 1932.

To increase the carrying capacity or the floor space of the truck body the various controls and the driver's seat are moved forwardly. Usually the back of the driver's seat is located in the position indicated by the broken line 26 so that the floor space available for the carrying of loads is only that space rearwardly of such line. Usually the clutch and brake connections and the clutch and brake pedals are at the rear or inner end of the motor 15 as is the steering connection.

Here 27 is a stud on which is turnable an arm 28 connected by a ball and socket joint 29 with any or the usual link 30 for turning the front wheels 13 of the truck in the steering operation. In the present case the steering wheel 31 and column 32 are moved forwardly and disposed laterally of the engine and on the lower end of the steering column is a worm (not shown) meshing with a worm wheel segment (not shown) in the usual manner. With this arrangement on turning of the steering wheel motion is transmitted through the segment above mentioned to an arm 33 connected by a ball and socket joint 34 with the forward end of a link 35.

The rear end of link 35 is connected by a ball and socket joint 36 with an arm 37 rigid with the arm 28. From this it will be apparent that while the steering wheel and column have been moved forwardly link 35 and its associated parts serve to carry motion rearwardly so that link 30 will be operated in the usual way and there is no necessity for changing the hook up to the front or steering wheels of the truck.

38 indicates the usual clutch control shaft or part. The clutch and brake operating pedals 39 and 40 are also shifted forwardly and are disposed laterally of or at the side of the engine. Also such parts are disposed at the outer side of the frame member 11. An extension 41 is connected with the clutch shaft 38 by a flexible coupling generally designated 42. The construction of the coupling is not material here and the coupling shown is of standard construction being taken from the Boston Gear Catalogue. Such coupling comprises a head piece 43 keyed or otherwise secured at 44 to the extension 41 and a head piece 45 keyed at 46 to the clutch operating shaft 38.

Head 45 includes projections 47 extending into recesses provided in head 43 to receive such projections. Between all opposing faces of the respective heads 43 and 45 there is arranged a thick layer of rubber 48. This rubber provides means whereby the two heads and consequently the shafts to which they are attached, may have some relative twisting motion and the rubber also provides for limited relative longitudinal movement of the heads and the shafts which they are connecting. It is noted that the extension 41 projects through the side frame member 11 but with the flexible coupling 42 arranged as shown, weaving of the frame is taken care of.

The clutch pedal 39 extends into the truck body for operation by the driver and includes a depending portion 49 pivotally mounted on a stud 50. An arm 51 fixed to the extension 41 is arranged substantially parallel with respect to the clutch pedal portion 49 and a connecting link 52 has its respective ends pivotally connected with the upper end of arm 51 and with the portion of the clutch pedal at the upper end of its vertical portion 49. Obviously on depression of the clutch pedal 39 link 52 will be drawn forwardly and its motion will be imparted to the arm 51 and from the latter through the extension 41 and coupling 42 to the clutch operating shaft 38 whose position has not been in any way changed. Thus it will be seen that while the clutch pedal has been moved forwardly and is now disposed at the side of the engine, suitable connections are provided so that motion of the clutch pedal is transmitted back to the usual clutch operating shaft 38.

The brake pedal 40 is of substantially the same construction as the clutch pedal and lies at the side of the latter as shown in Figs. 1 and 3. Pivot or stud 50 mounts the brake pedal and the latter by means of a link 54 is connected with any or the usual brake operating means 55 which may be for the operation of mechanical brakes (not shown) or for the control of the fluid of a hydraulic braking system including the reservoir 56 and the tubes 57 connecting such reservoir with the brakes of the respective wheels of the truck. From this it will be apparent that while the brake pedal has been moved forwardly it is, by means of the link 54, connected to the usual means for imparting brake pedal movement to the brake actuating means.

Since all the controls with the exception of the gear shift lever 58 have been moved forwardly it is possible to move the driver's seat forwardly and this has been done in the drawings. The seat 59 has been moved into the position shown from a position where its back was even with the broken line 26 above referred to. This places the seat at the side of the gear shift lever and the latter may be bent forwardly into position for the operator to conveniently reach it while the brake pedal, clutch pedal and steering wheel in their new positions are also convenient to the shifted seat.

Attention is called to the fact that while the controls have been moved forwardly the various means which the controls actuate or apply motion to have not been moved or had their places or positions changed. Thus the conversion may be accomplished in an economical or inexpensive manner. In actual practice the cubic capacity of a truck has been increased from one hundred and sixty cubic feet to two hundred and sixty-six cubic feet. The seat has been moved forward thirty-two inches thus giving a great deal more floor space for the carrying of loads. When the driver's seat is moved forwardly as shown it places the driver close to the windshield 60 and in a position where he may see at the sides and also immediately at the front of the truck. Re-enforcements 61 may be applied to the forward portions of the frame members 11 and 12 and if desired the front springs of the truck may be reenforced with additional leaves.

The panel 17 is of considerable width and height and is mounted in any convenient manner so as to permit of its removal whereby the radiator 16 and engine 15 may be lifted out through the front of the body 14. As here disclosed the panel is secured in place by bolts 62 although it will be understood that any other suitable means may be employed for the purpose. Accelerator pedal 63 has also been moved forwardly and in its new position is located convenient to the shifted driver's seat.

Having thus set forth the nature of my invention, what I claim is:—

1. In an automobile truck including a chassis mounting a body and a propelling engine extending into the body, an insulating housing enclosing the engine within the body, said housing hinged at its forward end for swinging movement to an open substantially vertical position exposing the engine to the interior of the body, means for securing such housing in said open position, and said hinge means including a removable hinge pin whereby the entire housing may be released and rendered removable from the body of the truck.

2. In an automobile including a chassis mounting a body and an engine within the body toward an end thereof, a heat and sound insulating housing enclosing the engine within the body, said housing hinged at its forward end for swinging movement to an open substantially vertical position exposing the engine to the interior of the body, a panel forwardly of the housing hinge and closing the end of the body toward which the engine is located, and means removably mounting the panel on the body independent of said housing whereby the panel may be removed to permit of movement of the engine through such end of the body.

PHILIP CARLSON.